(12) United States Patent
Lee et al.

(10) Patent No.: US 11,916,456 B2
(45) Date of Patent: Feb. 27, 2024

(54) CONNECTION STRUCTURE FOR A STATOR OF A DRIVE MOTOR

(71) Applicants: HYUNDAI MOTOR COMPANY, Seoul (KR); KIA CORPORATION, Seoul (KR)

(72) Inventors: Ga Eun Lee, Seongnam-si (KR); Dong Yeon Han, Seoul (KR); Yong Sung Jang, Hwaseong-si (KR); Deok Hwan Na, Seoul (KR); Jae Won Ha, Hwaseong-si (KR); Myung Kyu Jeong, Siheung-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 329 days.

(21) Appl. No.: 17/540,109

(22) Filed: Dec. 1, 2021

(65) Prior Publication Data

US 2022/0271599 A1 Aug. 25, 2022

(30) Foreign Application Priority Data

Feb. 24, 2021 (KR) .......................... 10-2021-0024489

(51) Int. Cl.
*H02K 3/52* (2006.01)
(52) U.S. Cl.
CPC ................................. *H02K 3/522* (2013.01)

(58) Field of Classification Search
CPC ....................................................... H02K 3/522
USPC ............................................................ 310/71
See application file for complete search history.

(56) References Cited

U.S. PATENT DOCUMENTS

| 10,128,718 | B2 * | 11/2018 | Murase | ................... | H02K 3/522 |
| 10,790,626 | B2 * | 9/2020 | Lee | ....................... | H01R 25/162 |
| 2010/0181851 | A1 * | 7/2010 | Shinkawa | ................ | H02K 3/28 |
| | | | | | 310/198 |
| 2012/0098379 | A1 * | 4/2012 | Yamaguchi | .............. | H02K 3/18 |
| | | | | | 310/198 |

\* cited by examiner

*Primary Examiner* — Alexander Talpalatski
(74) *Attorney, Agent, or Firm* — Lempia Summerfield Katz LLC

(57) ABSTRACT

A connection structure of a stator of a drive motor is configured to allow coils to be wound in a plurality of slots provided in a stator core and to connect the coils withdrawn from the slots. The coils are wound in the slots to form first-type structures and second-type structures configured such that withdrawal directions of three-phase (U-, W- and V-phase) withdrawal lines and N-phase withdrawal lines withdrawn from the slots of the first-type structures are opposite to withdrawal directions of three-phase (U-, W- and V-phase) withdrawal lines and N-phase withdrawal lines withdrawn from the slots of the second-type structures. The first-type structures and the second-type structures are disposed symmetrically to each other with respect to a reference line formed to divide the slots in half.

15 Claims, 5 Drawing Sheets

CONNECTION STRUCTURE FOR A STATOR OF A DRIVE MOTOR

CROSS-REFERENCE TO RELATED APPLICATION

This application claims under 35 U.S.C. § 119(a) the benefit of priority to Korean Patent Application No. 10-2021-0024489 filed on Feb. 24, 2021, the entire contents of which are incorporated herein by reference.

BACKGROUND

(a) Technical Field

The present disclosure relates to a connection structure of coils withdrawn from slots of a stator of a drive motor.

(b) Background Art

In general, hybrid electric vehicles and electric vehicles, which are eco-friendly vehicles, may generate driving force using a drive motor that generates rotating power using electrical energy. A hybrid electric vehicle is capable of running in an electrical vehicle (EV) mode, in which only the power of a drive motor is used, or in a hybrid electric vehicle (HEV) mode, in which both the rotating power of an engine and the rotating power of the drive motor are used as driving force. Further, a general electric vehicle runs using the rotating power of a drive motor as driving force.

A drive motor used in eco-friendly vehicles fundamentally includes a stator and a rotor. For example, the stator is coupled to the inside of a motor housing, and the rotor is disposed inside the stator so as to be spaced apart from the inner surface of the stator by a designated gap. The stator of the drive motor includes a stator core formed by stacking electrical steel sheets, and coils wound in slots of the stator core. When an alternating current is applied to the coils, the stator may generate rotating electric fields, and thus the rotor may generate rotating torque based on the rotating electric fields.

Referring to FIG. 1 illustrates a stator and a circle-type terminal of a general drive motor for eco-friendly vehicles, in which coils 20 are wound on a bobbin 15 provided on a stator core 10. The wound coils 20 are exposed from the upper end of the stator core 10. A circle-type terminal 30, which is an injection-molded plastic structure, is provided at the upper end of the stator core 10, and the coils 20 are withdrawn to the inside of the circle-type terminal 30. Bus bars 40, for connecting the withdrawn coils 20 by a method such as fusion welding, are provided inside the circle-type terminal 30. Here, a plurality of bus bars 40 is provided corresponding to respective phases (e.g., U-, V-, W- and N-phases) of power connected thereto. Separate structures for insulation between the bus bars 40 are provided in the circle-type terminal.

However, because the circle-type terminal 30 is located on the stator core 10, the height of the drive motor is increased by the height h of the circle-type terminal 30. Also, an additional process for insulation inside the circle-type terminal 30 is required. Further, due to the presence of the circle-type terminal 30, it is difficult to change the position of three-phase withdrawal parts in which the coils 20 are collected. Also, the fixed position of the three-phase withdrawal parts causes inefficiency in connection of the coils 20 withdrawn from the stator core 10.

The above information disclosed in this Background section is only to enhance understanding of the background of the disclosure. Therefore, the Background section may contain information that does not form the prior art that is already known in this country to a person of ordinary skill in the art.

SUMMARY OF THE DISCLOSURE

The present disclosure has been made in an effort to solve the above-described problems associated with the prior art. It is an object of the present disclosure to provide a connection structure of a stator of a drive motor that obviates a circle-type terminal and thus enables the length of coils for connection to be reduced.

It is another object of the present disclosure to provide a connection structure of a stator of a drive motor that allows the stator to employ a structure of enabling coils to be withdrawn from slots in two manners so as to reduce the lengths of coils for connection and thus to increase the efficiency of the drive motor.

In one aspect, the present disclosure provides a connection structure of a stator of a drive motor. The connection structure is configured to allow coils to be wound in a plurality of slots provided in a stator core and to connect the coils withdrawn from the slots. The coils are wound in the slots to form first-type structures and second-type structures. Each structure is configured such that a withdrawal direction of three-phase (U-, W- and V-phase) withdrawal lines withdrawn from the slots of the first-type structures and a withdrawal direction of N-phase withdrawal lines withdrawn from the slots of the first-type structures are opposite to a withdrawal direction of three-phase (U-, W- and V-phase) withdrawal lines withdrawn from the slots of the second-type structures and a withdrawal direction of N-phase withdrawal lines withdrawn from the slots of the second-type structures. Also. the first-type structures and the second-type structures are disposed symmetrically to each other with respect to a reference line formed to divide the slots in half.

In an embodiment, the three-phase (U-, W- and V-phase) withdrawal lines of the first-type structures and the second-type structures may be withdrawn in a direction moving towards three-phase withdrawal parts configured such that the three-phase (U-, W- and V-phase) withdrawal lines are collected therein.

In another embodiment, the first-type structures may be disposed to left of a reference line, the second-type structures may be disposed to right of the reference line, the three-phase (U-, W- and V-phase) withdrawal lines of the first-type structures may be withdrawn rightwards based on an outward direction from the stator core, and the three-phase (U-, W- and V-phase) withdrawal lines of the second-type structures may be withdrawn leftwards based on the outward direction from the stator core.

In still another embodiment, a part of a boundary between the first-type structures and the second-type structure adjacent to three-phase withdrawal parts is configured such that the three-phase (U-, W- and V-phase) withdrawal lines are collected therein and may be defined as a first boundary part. Another part of the boundary opposite the first boundary part may be defined as a second boundary part.

In yet another embodiment, three slots of the first-type structures adjacent to the first boundary part may be defined as first slots and three slots of the second-type structures adjacent to the first boundary part may be defined as second slots. The three-phase (U-, W- and V-phase) withdrawal lines withdrawn from the first slots and the second slots may be directly connected to the three-phase withdrawal parts.

In still yet another embodiment, the N-phase withdrawal lines withdrawn from the first slots and the second slots may be connected to three-phase (U-, W- and V-phase) serial connection parts.

In a further embodiment, three slots of the first-type structures located in a counterclockwise direction based on the first slots may be defined as third slots and three slots of the second-type structures located in a clockwise direction based on the second slots may be defined as fourth slots. The N-phase withdrawal lines withdrawn from the third slots may be connected to one another by a first N-phase serial connection part and the N-phase withdrawal lines withdrawn from the fourth slots may be connected to one another by a second N-phase serial connection part.

In another further embodiment, three slots of the first-type structures adjacent to the second boundary part may be defined as fifth slots and three slots of the second-type structures adjacent to the second boundary part may be defined as sixth slots. The N-phase withdrawal lines withdrawn from the fifth slots may be connected to one another by a first N-phase serial connection part and the N-phase withdrawal lines withdrawn from the sixth slots may be connected to one another by a second N-phase serial connection part.

In still another further embodiment, the three-phase (U-, W- and V-phase) withdrawal lines withdrawn from the fifth slots and the sixth slots may be connected to one or more three-phase (U-, W- and V-phase) serial connection parts.

In yet another further embodiment, three slots of first-type structures adjacent to the fifth slots may be defined as seventh slots and three slots of the second-type structures adjacent to the sixth slots may be defined as eighth slots. The three-phase (U-, W- and V-phase) withdrawal lines withdrawn from the seventh slots and the eighth slots may be directly connected to the three-phase withdrawal parts.

In another aspect, the present disclosure provides a connection structure of a stator of a drive motor. The connection structure is configured to allow coils to be wound in a plurality of slots provided in a stator core and to expose the coils from an upper end of the stator core. The coils are wound in the slots to form first-type structures and second-type structures. The structures are configured such that a withdrawal direction of three-phase (U-, W- and V-phase) withdrawal lines withdrawn from the slots of the first-type structures and a withdrawal direction of N-phase withdrawal lines withdrawn from the slots of the first-type structures are opposite to a withdrawal direction of three-phase (U-, W- and V-phase) withdrawal lines withdrawn from the slots of the second-type structures and a withdrawal direction of N-phase withdrawal lines withdrawn from the slots of the second-type structures. The stator core includes eight poles and twenty-four slots, and each of the first-type structures and the second-type structures are applied to twelve slots continuously arranged.

In an embodiment, the first-type structures may be configured such that each of the three-phase (U-, W- and V-phase) withdrawal lines is withdrawn from a first side of a corresponding one of the first-type structures. Each of the N-phase withdrawal lines is withdrawn from a second side of the corresponding one of the first-type structures. Further, the second-type structures may be configured such that each of the N-phase withdrawal lines is withdrawn from a first side of a corresponding one of the second-type structures. Also, each of the three-phase (U-, W- and V-phase) withdrawal lines is withdrawn from a second side of the corresponding one of the second-type structures.

In another embodiment, the first side of the corresponding one of the first-type structures and the second side of the corresponding one of the second-type structures may be a side of the corresponding one of the first-type structures and a side of the corresponding one of the second-type structures, configured to face a boundary between the first-type structures and the second-type structures based on a circumferential direction of the stator core.

In still another embodiment, the three-phase (U-, W- and V-phase) withdrawal lines withdrawn from the slots of the first-type structures and the second-type structures, configured to be located at first, second, third, seventh, eighth, and ninth positions based on a part of a boundary between the first-type structures and the second-type structure adjacent to three-phase withdrawal parts, configured such that the three-phase (U-, W- and V-phase) withdrawal lines are collected therein, may be directly connected to the three-phase withdrawal parts.

In yet another embodiment, the N-phase withdrawal lines withdrawn from the slots of the first-type structures, configured to be located at tenth, eleventh, and twelfth positions based on the boundary, may be connected to one another by an N-phase serial connection part. The N-phase withdrawal lines withdrawn from the slots of the second-type structures, configured to be located at tenth, eleventh, and twelfth positions based on the boundary, may be connected to one another by another N-phase serial connection part.

The above and other aspects, features, and embodiments of the disclosure are discussed below.

BRIEF DESCRIPTION OF THE DRAWINGS

The above and other features of the present disclosure are now described in detail with reference to certain embodiments thereof illustrated in the accompanying drawings which are given hereinbelow by way of illustration only, and thus are not limitative of the present disclosure, and wherein.

Figure 1:
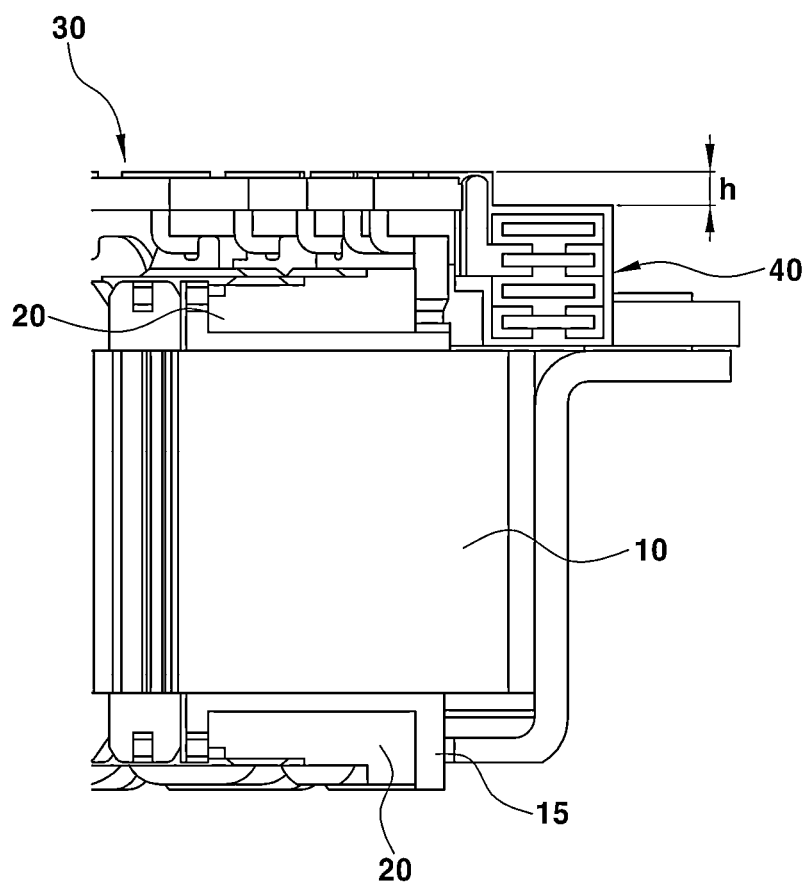
FIG. 1 is a schematic view illustrating a stator and a circle-type terminal of a general drive motor for eco-friendly vehicles.

It should be understood that the appended drawings are not necessarily to scale and present a somewhat simplified representation of various features illustrative of the basic principles of the disclosure. The specific design features of the present inventive concept as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Advantages and features of the present disclosure and methods for achieving the same should become apparent from the descriptions of embodiments given herein below with reference to the accompanying drawings. However, the present disclosure is not limited to the embodiments disclosed herein and may be implemented in various different forms. The embodiments are provided to make the description of the present inventive concept thorough and to fully convey the scope of the present disclosure to those having ordinary skill in the art. It is to be noted that the scope of the present disclosure is defined only by the claims. In the following description of the present inventive concept, the same or similar elements are denoted by the same reference numerals even when they are depicted in different drawings.

Further, in the following description of the embodiments, terms, such as "first" and "second", are used only to distinguish one element from other elements. These terms should not be construed as being limiting with regard to the sequence thereof.

Hereinafter, reference is made in detail to various embodiments of the present disclosure, examples of which are illustrated in the accompanying drawings and described below. While the disclosure is described in conjunction with several embodiments, it should be understood that the present description is not intended to limit the disclosure to the several embodiments. On the contrary, the disclosure is intended to cover not only the several embodiments, but also various alternatives, modifications, equivalents, and other embodiments, which may be included within the spirit and scope of the disclosure as defined by the appended claims. In addition, the claims disclosed herein are to be interpreted as encompassing other embodiments.

Figure 2:
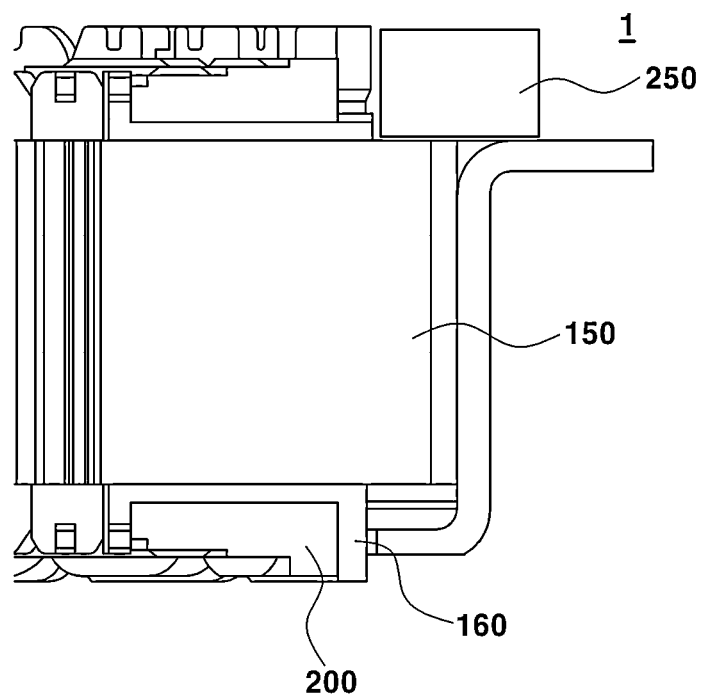
FIG. 2 is a schematic view illustrating a stator of a drive motor for eco-friendly vehicles according to one embodiment of the present disclosure.

FIG. 2 is a schematic view illustrating a stator of a drive motor for eco-friendly vehicles according to one embodiment of the present disclosure.

Referring to FIG. 2, a stator 1, which is one element of a drive motor, may include a stator core 150 configured such that a plurality of teeth and slots are defined, a bobbin 160 provided to surround the stator core 150, and coils 200 wound on the bobbin 160. In other words, the coils 200 may be wound in the slots of the stator core 150.

The wound coils 200 may be withdrawn from the upper end of the stator core 150 so as to be connected. In other words, the coils 200 may be connected at a coil connector 250 without a separate element for connecting the coils 200. The detailed connection structure of the coils 200 are described below. Because a circle-type terminal applied to the conventional drive motor is omitted, the height of the drive motor may be reduced. Here, the height of the drive motor means the height of the drive motor in the direction of a rotating shaft of the drive motor. Further, because the circle-type terminal applied to the conventional drive motor is omitted, the expense of manufacturing the circle-type terminal may be eliminated and a process for connecting the coils 200 and a process for insulating the coils 200 due to the application of the circle-type terminal may be eliminated.

Figure 3:
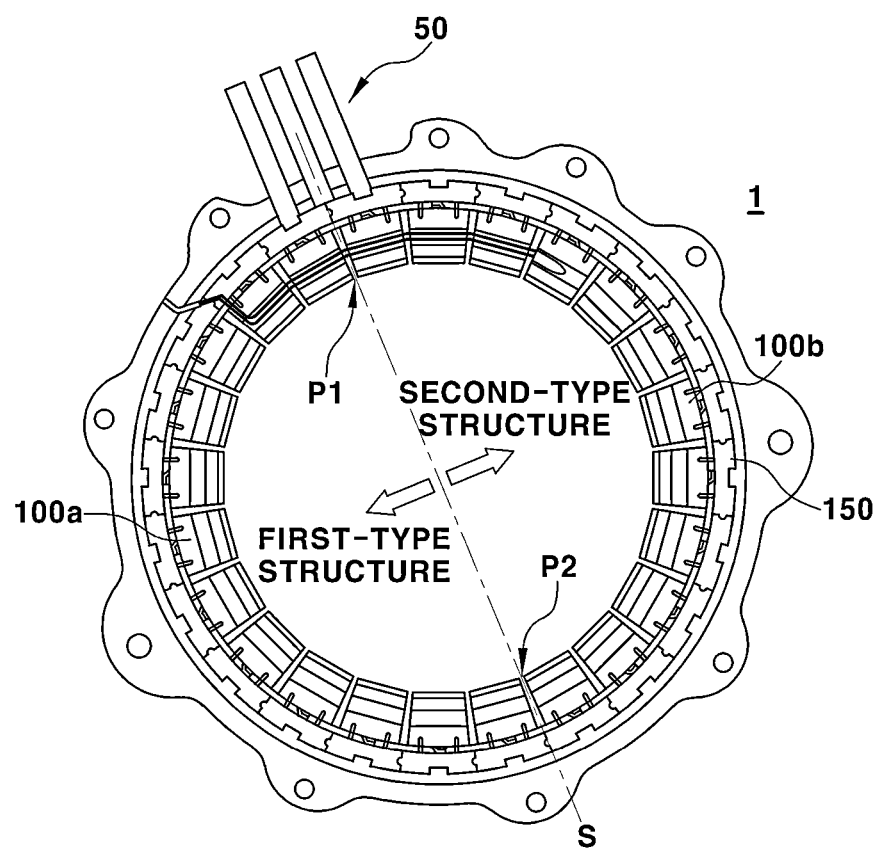
FIG. 3 is a plan view illustrating the stator of the drive motor according to one embodiment of the present disclosure.
Figure 4:
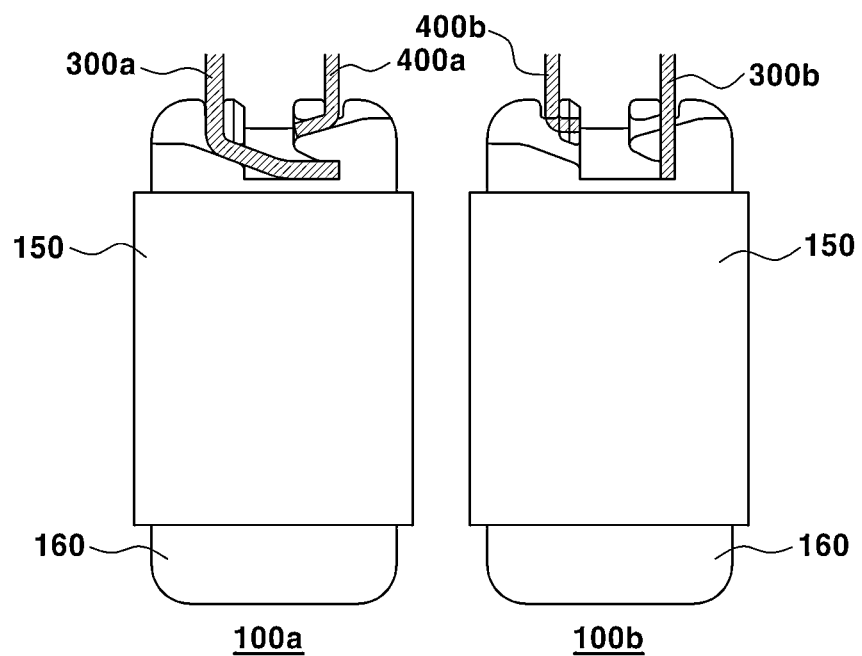
FIG. 4 is a view illustrating two coil withdrawal manners according to one embodiment of the present disclosure.

FIG. 3 is a plan view illustrating the stator of the drive motor according to one embodiment of the present disclosure. FIG. 4 is a view illustrating two coil withdrawal manners according to one embodiment of the present disclosure. FIG. 4 is a view in which the center of the stator core 150 is seen from the outside of the stator core 150.

Referring to FIGS. 2-4, the stator 1 may include the stator core 150 including eight poles and twenty-four slots. The bobbin 160 may be provided on the teeth (not shown) of the stator core 150 and the coils 200 may be wound on the bobbin 150. In other words, a plurality of slots may be defined on the stator core 150 by the teeth (not shown) of the stator core 150 and the coils 200 may be wound in the slots.

The coils 200 wound in the slots may be withdrawn towards the outside of the stator core 150. The coils 200 wound on the stator core 150 may be divided into first-type structures 100a and second-type structures 100b depending on the direction in which the coils 200 are withdrawn from the slots. In other words, the connection structure of the stator 1 may include the first-type structures 100a and the second-type structures 100b configured such that directions in which three-phase (U-, W- and V-phase) withdrawal lines 300a and 300b and N-phase withdrawal lines 400a and 400b are withdrawn from the slots are opposite to each other. In other words, the first-type structures 100a and the second-type structures 100b are distinguished from each other based on the directions in which the coils 200 are withdrawn from the slots. For example, each of the first-type structures 100a and the second-type structures 100b may generally be a structure in which the coil 200 is wound in each of the slots. A plurality of three-phase (U-, W- and V-phase) withdrawal lines 300a and 300b withdrawn from the slots may be collected at three-phase withdrawal parts 50 and may then be withdrawn to the outside of the stator 1.

Here, the first-type structures 100a and the second-type structures 100b may be provided in plural. The first-type structures 100a and the second-type structures 100b may be disposed symmetrically to each other with respect to a reference line S, which divides the stator 1, i.e., the slots of the stator 1, in half. The three-phase withdrawal parts 50 may be provided at a specific region of the stator core 150. In one embodiment of the present disclosure, the reference line S may be set based on a V-phase withdrawal part 50 among the three-phase withdrawal parts 50 (i.e., the middle one 50 of the three-phase withdrawal parts 50). In other words, the first-type structures 100a and the second-type structures 100b may be provided in the same number and each of the first-type structures 100a and the second-type structures 100b may be continuously arranged. For example, each of the first-type structures 100a and the second-type structures 100b may be applied to twelve slots which are continuously arranged. In other words, twelve first-type structures 100a are continuously arranged and then twelve second-type structures 100b are continuously arranged, thereby forming the stator 1. The boundary between the first-type structures 100a and the second-type structures 100b may be set based on the reference line S. A part of the boundary adjacent to the three-phase withdrawal parts 50 may be defined as a first boundary part P1 and another part of the boundary opposite the first boundary part P1 may be defined as a second boundary part P2. The second boundary part P2 may be a point that is spaced apart from the three-phase withdrawal parts 50 at the boundary between the first-type structures 100a and the second-type structures 100b.

The three-phase (U-, W- and V-phase) withdrawal lines 300a and 300b of the first-type structures 100a and the second-type structures 100b may be withdrawn in a direction moving towards the three-phase withdrawal parts 50. Each of the three-phase (U-, W- and V-phase) withdrawal lines 300a may be withdrawn from one side, i.e., a first side, of a corresponding one of the first-type structures 100a and each of the N-phase withdrawal lines 400a may be withdrawn from the other side, i.e., a second side, of the corresponding one of the first-type structure 100a. Each of the N-phase withdrawal lines 400b may be withdrawn from one side, i.e., a first side, of a corresponding one of the second-type structures 100b and each of the three-phase (U-, W- and V-phase) withdrawal lines 300b may be withdrawn from the other side, i.e., a second side, of the corresponding one of the second-type structures 100b. The one side of the first-type structure 100a and the other side of the second-type structures 100b mean the sides of the first-type structure 100a and the second-type structures 100b that face the boundary between the first-type structures 100a and the second-type structures 100b based on the circumferential direction of the stator core 150.

For example, the first-type structures 100a may be disposed to the left of the reference line S and the second-type structures 100b may be disposed to the right of the reference line S. The three-phase (U-, W- and V-phase) withdrawal lines 300a of the first-type structures 100a may be withdrawn to the right in an outward direction from the stator core 150. The three-phase (U-, W- and V-phase) withdrawal lines 300b of the second-type structures 100b may be withdrawn to the left in the outward direction from the stator core 150. Further, the N-phase withdrawal lines 400a of the first-type structures 100a may be withdrawn to the left in the outward direction from the stator core 150. Further, the N-phase withdrawal lines 400b of each of the second-type structures 100b may be withdrawn to the right in the outward direction from the stator core 150. Consequently, the three-phase (U-, W- and V-phase) withdrawal lines 300a and 300b may be withdrawn in a direction moving towards the three-phase withdrawal parts 50 and the N-phase withdrawal lines 400a and 400b may be withdrawn in a direction moving far away from the three-phase withdrawal parts 50.

Because the three-phase (U-, W- and V-phase) withdrawal lines 300a and 300b are connected so as to be collected at the three-phase withdrawal parts 50, the lengths of the coils 200 for connection between the three-phase (U-, W- and V-phase) withdrawal lines 300a and 300b and the three-phase withdrawal parts 50 may be directly related to the efficiency of the drive motor. According to one embodiment of the present disclosure, because the three-phase (U-, W- and V-phase) withdrawal lines 300a and 300b are withdrawn in the direction moving towards the three-phase withdrawal parts 50, the lengths of the coils 200 for connection may be reduced. Because the lengths of the coils 200 for connection are reduced, the resistance of the drive motor may be reduced and thus the efficiency of the drive motor may be increased.

Figure 5:
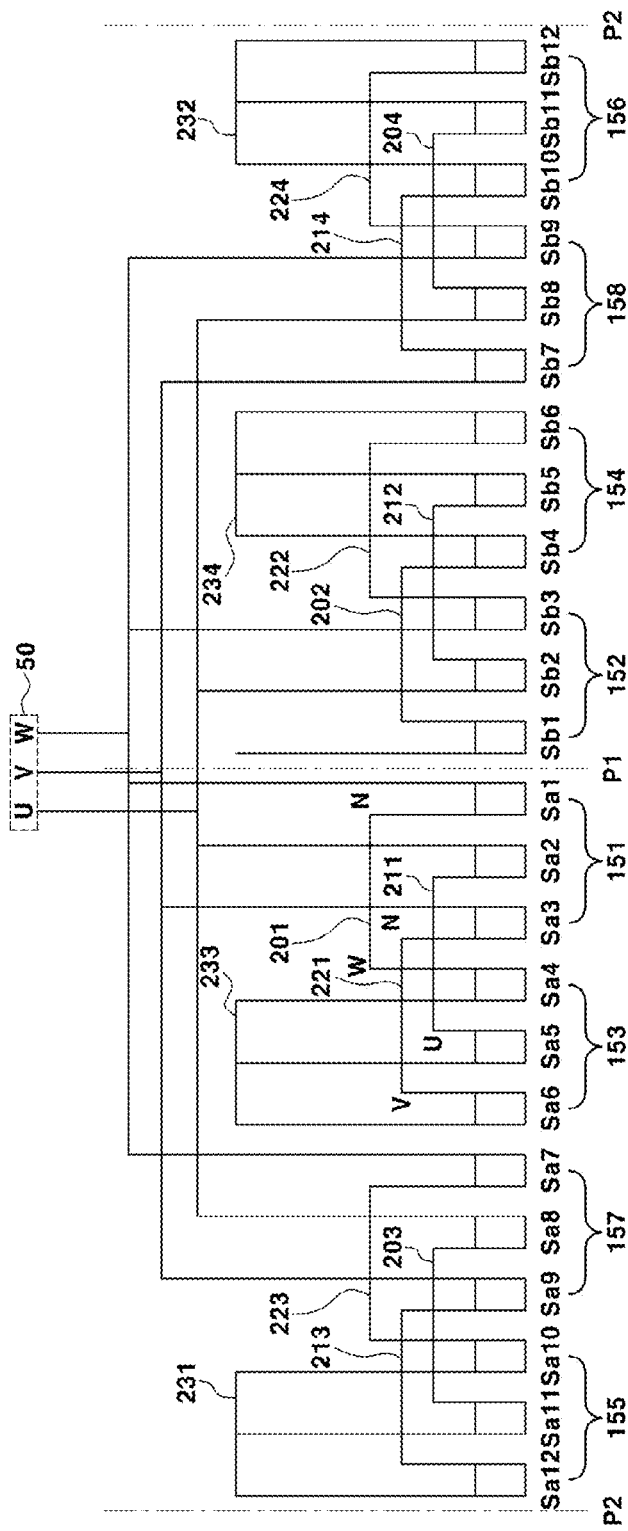
FIG. 5 is a view illustrating a connection structure of the stator of the drive motor according to one embodiment of the present disclosure.

FIG. 5 is a view illustrating the connection structure of the stator of the drive motor according to one embodiment of the present disclosure.

Referring to FIGS. 3-5, the coils 200 may be wound in the twenty-four slots to form the first-type structures 100a and the second-type structures 100b. The slots may include slots Sa1, Sa2, Sa3, Sa4, Sa5, Sa6, Sa7, Sa8, Sa9, Sa10, Sa11, and Sa12 in which the coils 200 are wound to form the first-type structures 100a. The slots may also include slots Sb1, Sb2, Sb3, Sb4, Sb5, Sb6, Sb7, Sb8, Sb9, Sb10, Sb11, and Sb12 in which the coils 200 are wound to form the second-type structures 100b. The first-type structures 100a are illustrated to the left and the second-type structures 100b are illustrated to the right of the first boundary part P1 between the first-type structures 100a and the second-type structures 100b based on the reference line S. The slots of the first-type structures 100a may include a slot Sa1 located at the first position from the first boundary part P1, a slot Sa2 located at the second position, a slot Sa3 located at the third position, a slot Sa4 located at the fourth position, a slot Sa5 located at the fifth position, a slot Sa6 located at the sixth position, a slot Sa7 located at the seventh position, a slot Sa8 located at the eighth position, a slot Sa9 located at the ninth position, a slot Sa10 located at the tenth position, a slot Sa11 located at the eleventh position and a slot Sa12 located at the twelfth position. The slots of the second-type structures 100b may include a slot Sb1 located at the first position from the first boundary part P1, a slot Sb2 located at the second position, a slot Sb3 located at the third position, a slot Sb4 located at the fourth position, a slot Sb5 located at the fifth position, a slot Sb6 located at the sixth position, a slot Sb7 located at the seventh position, a slot Sb8 located at the eighth position, a slot Sb9 located at the ninth position, a slot Sb10 located at the tenth position, a slot Sb11 located at the eleventh position and a slot Sb12 located at the twelfth position. This sequence of the slots may be defined as a sequence in which the slots are located at increasing distances from the first boundary part P1. In other words, the slots Sa1 and Sb1 may be slots which are closest to the first boundary part P1 and the slots Sa12 and Sb12 may be slots which are farthest away from the first boundary part P1. The slots Sa12 and Sb12 may be slots which are closest to the second boundary part P2.

In order to describe the connection structure of the stator, twenty-four slots may be divided into sets of eight slots. The three slots Sa1, Sa2, and Sa3 of the first-type structures 100a, which are adjacent to the first boundary part P1, may be defined as first slots 151. The three slots Sb1, Sb2, and Sb3 of the second-type structures 100b, which are adjacent to the first boundary part P1, may be defined as second slots 152. The three slots Sa4, Sa5, and Sa6 of the first-type structures 100a, which are located in the counterclockwise direction based on the first slots 151, may be defined as third slots 153. The three slots Sb4, Sb5, and Sb6 of the second-type structures 100b, which are located in the clockwise direction based on the second slots 152, may be defined as fourth slots 154. In other words, the three slots Sa4, Sa5, and Sa6, which are located in a direction moving away from the first boundary part P1 based on the first slots 151 may be defined as the third slots 153. Also, the three slots Sb4, Sb5, and Sb6, which are located in a direction moving away from the first boundary part P1 based on the second slots 152, may be defined as the fourth slots 154. The three slots Sa10, Sa11, and Sa12 of the first-type structures 100a, which are adjacent to the second boundary part P2, may be defined as fifth slots 155. Also, the three slots Sb10, Sb11, and Sb12 of the second-type structures 100b, which are adjacent to the second boundary part P2, may be defined as sixth slots 156. In other words, the three slots Sa10, Sa11, and Sa12 of the first-type structures 100a, which are disposed farthest from the first boundary part P1, may be defined as the fifth slots 155 and the three slots Sb10, Sb11, and Sb12 of the second-type structures 100b, which are disposed farthest from the second boundary part P2, may be defined as the sixth slots 156. The three slots Sa7, Sa8, and Sa9 of the first-type structures 100a, which are adjacent to the fifth slots 155, may be defined as seventh slots 157. The three slots Sb7, Sb8, and Sb9 of the second-type structures 100b, which are adjacent to the sixth slots 156, may be defined as eighth slots 158. In other words, the three slots Sa7, Sa8, and Sa9 of the first-type structures 100a, which are located between the third slots 153 and the fifth slots 155, may be defined as the seventh slots 157 and the three slots Sb7, Sb8, and Sb9 of the second-type structures 100b, which are located between the fourth slots 154 and the sixth slots 156, may be defined as the eighth slots 158.

In one embodiment of the present disclosure, the slots Sa2, Sa5, Sa8, and Sa11 of the first-type structures 100a, which are located at the second, fifth, eighth, and eleventh positions, and the slots Sb2, Sb5, Sb8, and Sb11 of the second-type structures 100b, which are located at the second, fifth, eighth, and eleventh positions, may be slots from which U-phase coils 200 are respectively withdrawn. However, the positions of the slots from which the U-phase coils 200 are respectively withdrawn may be changed. As one example, the slots Sa1, Sa4, Sa7, and Sa10 of the first-type structures 100*a*, which are located at the first, fourth, seventh, and tenth positions, and the slots Sb1, Sb4, Sb7, and Sb10 of the second-type structures 100*b*, which are located at the first, fourth, seventh, and tenth positions, may be the slots from which the U-phase coils 200 are respectively withdrawn. As another example, the slots Sa3, Sa6, Sa9, and Sa12 of the first-type structures 100*a*, which are located at the third, sixth, ninth, and twelfth positions, and the slots Sb3, Sb6, Sb9, and Sb12 of the second-type structures 100*b*, which are located at the third, sixth, ninth, and twelfth positions, may be slots from which the U-phase coils 200 are respectively withdrawn.

The three-phase (U-, W- and V-phase) withdrawal lines 300*a* and 300*b* withdrawn from the first slots 151 and the second slots 152 may be directly connected to the three-phase withdrawal parts 50. Concretely, the three-phase (U-, W- and V-phase) withdrawal lines 300*a* of the slots Sa1, Sa2, and Sa3 of the first-type structures 100*a*, which are located at the first, second and third positions, may be directly connected to the three-phase withdrawal parts 50. The three-phase (U-, W- and V-phase) withdrawal lines 300*b* of the slots Sb1, Sb2, and Sb3 of the second-type structures 100*b*, which are located at the first, second and third positions, may be directly connected to the three-phase withdrawal parts 50.

The N-phase withdrawal lines 400*a* and 400*b* withdrawn from the first slots 151 and the second slots 152 may be connected to three-phase serial connection parts 201, 211, 221, 202, 212, and 222. The three-phase serial connection parts 201, 211, 221, 202, 212, and 222 may be parts which connect the three-phase (U-, W- and V-phase) withdrawal lines 300*a* and 300*b* and the N-phase withdrawal lines 400*a* and 400*b* to each other. The N-phase withdrawal line 400*a* withdrawn from the slot Sa1 of the first-type structure 100*a*, which is located at the first position, may be connected to the three-phase (U-, W- or V-phase) withdrawal line 300*a* withdrawn from the slot Sa4 of the first-type structure 100*a*, which is located at the fourth position, by a first three-phase serial connection part 201. The N-phase withdrawal line 400*b* withdrawn from the slot Sb1 of the second-type structures 100*b*, which is located at the first position, may be connected to the three-phase (U-, W- or V-phase) withdrawal line 300*b* withdrawn from the slot Sb4 of the second-type structures 100*b*, which is located at the fourth position, by a second three-phase serial connection part 202. The N-phase withdrawal line 400*a* withdrawn from the slot Sa2 of the first-type structure 100*a*, which is located at the second position, may be connected to the three-phase (U-, W- or V-phase) withdrawal line 300*a* withdrawn from the slot Sa5 of the first-type structure 100*a*, which is located at the fifth position, by a third three-phase serial connection part 211. The N-phase withdrawal line 400*b* withdrawn from the slot Sb2 of the second-type structures 100*b*, which is located at the second position, may be connected to the three-phase (U-, W- or V-phase) withdrawal line 300*b* withdrawn from the slot Sb5 of the second-type structures 100*b*, which is located at the fifth position, by a fourth three-phase serial connection part 212. The N-phase withdrawal line 400*a* withdrawn from the slot Sa3 of the first-type structure 100*a*, which is located at the third position, may be connected to the three-phase (U-, W- or V-phase) withdrawal line 300*a* withdrawn from the slot Sa6 of the first-type structure 100*a*, which is located at the sixth position, by a fifth three-phase serial connection part 221. The N-phase withdrawal line 400*b* withdrawn from the slot Sb3 of the second-type structures 100*b*, which is located at the third position, may be connected to the three-phase (U-, W- or V-phase) withdrawal line 300*b* withdrawn from the slot Sb6 of the second-type structures 100*b*, which is located at the sixth position, by a sixth three-phase serial connection part 222.

The N-phase withdrawal lines 400*a* and 400*b* withdrawn from the fifth slots 155 and the sixth slots 156 and the N-phase withdrawal lines 400*a* and 400*b* withdrawn from the third slots 153 and the fourth slots 154 may be respectively connected by N-phase serial connection parts 231, 232, 233, and 234. The N-phase serial connection parts 231, 232, 233, and 234 may be parts which connect the N-phase withdrawal lines 400*a* and 400*b* to one another. Concretely, the N-phase withdrawal lines 400*a* of the slots Sa10, Sa11, and Sa12 of the first-type structures 100*a*, which are located at the tenth, eleventh and twelfth positions, may be connected to one another by the first N-phase serial part 231. The N-phase withdrawal lines 400*b* of the slots Sb10, Sb11, and Sb12 of the second-type structures 100*b*, which are located at the tenth, eleventh and twelfth positions, may be connected to one another by the second N-phase serial part 232. The N-phase withdrawal lines 400*a* of the slots Sa4, Sa5, and Sa6 of the first-type structures 100*a*, which are located at the fourth, fifth, and sixth positions, may be connected to one another by the third N-phase serial part 233. The N-phase withdrawal lines 400*b* of the slots Sb4, Sb5, and Sb6 of the second-type structures 100*b*, which are located at the fourth, fifth, and sixth positions, may be connected to one another by the fourth N-phase serial part 234.

The three-phase (U-, W- and V-phase) withdrawal lines 300*a* and 300*b* of the seventh slots 157 and the eighth slots 158 may be directly connected to the corresponding three-phase withdrawal parts 50. Concretely, the three-phase (U-, W- and V-phase) withdrawal lines 300*a* of the slots Sa7, Sa8, and Sa9 of the first-type structures 100*a*, which are located at the seventh, eighth, and ninth positions, may be directly connected to the corresponding three-phase withdrawal parts 50. The three-phase (U-, W- and V-phase) withdrawal lines 300*b* of the slots Sb7, Sb8, and Sb9 of the second-type structures 100*b*, which are located at the seventh, eighth, and ninth positions, may be directly connected to the corresponding three-phase withdrawal parts 50.

According to one embodiment of the present disclosure, the phases of the coils 200 withdrawn from the slots may be changed, but the connection structure of the three-phase (U-, W- and V-phase) withdrawal lines 300*a* and 300*b* and the N-phase withdrawal lines 400*a* and 400*b* withdrawn from the slots may be the same. In other words, the three-phase (U-, W- and V-phase) withdrawal lines 300*a* and 300*b* withdrawn from the slots Sa1, Sb1, Sa2, Sb2, Sa3, Sb3, Sa7, Sb7, Sa8, Sb8, Sa9, and Sb9 of the first-type structures 100*a* and the second-type structures 100*b*, which are located at the first, second, third, seventh, eighth, and ninth positions based on the first boundary part P1, may be directly connected to the corresponding three-phase withdrawal parts 50. Further, the N-phase withdrawal lines 400*a* withdrawn from the slots Sa10, Sa11, and Sa12 of the first-type structures 100*a*, which are located at the tenth, eleventh, and twelfth positions based on the first boundary part P1, may be connected to one another by the N-phase serial connection part 231. Further, the N-phase withdrawal lines 400*b* withdrawn from the slots Sb10, Sb11, and Sb12 of the second-type structures 100*b*, which are located at the tenth, eleventh, and twelfth positions based on the first boundary part P1, may be connected to one another by the N-phase serial connection part 232. In other words, because the three-phase (U-, W- and V-phase) withdrawal lines 300a and 300b withdrawn from the six slots Sa10, Sa11, Sa12, Sb10, Sb11, and Sb12, which are farthest from the first boundary part P1 or the three-phase withdrawal parts 50, are not directly connected to the three-phase withdrawal parts 50, the lengths of the coils 200 required for the connection structure of the stator 1 may be reduced. In other words, the lengths of the coils 200 for directly connecting the slots to the three-phase withdrawal parts 50 are reduced, and thus, the resistance of the drive motor may be reduced.

As is apparent from the above description, one embodiment of the present disclosure may provide a connection structure of a stator of a drive motor that may obviate a circle-type terminal applied to the conventional drive motor and thus reduce the height of the drive motor. Further, because the circle-type terminal is omitted, expense of manufacturing the circle-type terminal may be eliminated and a process for connecting coils and a process for insulating the coils due to the application of the circle-type terminal may be eliminated.

In the connection structure according to one embodiment of the present disclosure, three-phase (U-, W- and V-phase) withdrawal lines are withdrawn from slots in a direction moving towards the three-phase withdrawal parts, and thus the lengths of coils for connection may be reduced. As the length of the coils for connection are reduced, the resistance of the drive motor is reduced, and thus the efficiency of the drive motor may be increased.

The inventive concept has been described in detail with reference to several embodiments thereof. However, it will be appreciated by those having ordinary skill in the art that changes may be made to these embodiments without departing from the principles and spirit of the disclosure, the scope of which is defined in the appended claims and their equivalents.

What is claimed is:

1. A connection structure of a stator of a drive motor, the connection structure configured to allow coils to be wound in a plurality of slots provided in a stator core and to connect the coils withdrawn from the slots, wherein:
   the coils are wound in the slots to form first-type structures and second-type structures configured such that a withdrawal direction of three-phase (U-, W- and V-phase) withdrawal lines withdrawn from the slots of the first-type structures and a withdrawal direction of N-phase withdrawal lines withdrawn from the slots of the first-type structures are opposite to a withdrawal direction of three-phase (U-, W- and V-phase) withdrawal lines withdrawn from the slots of the second-type structures and a withdrawal direction of N-phase withdrawal lines withdrawn from the slots of the second-type structures; and
   the first-type structures and the second-type structures are disposed symmetrically to each other with respect to a reference line formed to divide the slots in half.

2. The connection structure of claim 1, wherein the three-phase (U-, W- and V-phase) withdrawal lines of the first-type structures and the second-type structures are withdrawn in a direction moving towards three-phase withdrawal parts configured such that the three-phase (U-, W- and V-phase) withdrawal lines are collected therein.

3. The connection structure of claim 2, wherein:
   the first-type structures are disposed to left of a reference line, and the second-type structures are disposed to right of the reference line;
   the three-phase (U-, W- and V-phase) withdrawal lines of the first-type structures are withdrawn rightwards based on an outward direction from the stator core; and
   the three-phase (U-, W- and V-phase) withdrawal lines of the second-type structures are withdrawn leftwards based on the outward direction from the stator core.

4. The connection structure of claim 1, wherein a part of a boundary between the first-type structures and the second-type structure adjacent to three-phase withdrawal parts is configured such that the three-phase (U-, W- and V-phase) withdrawal lines are collected therein and is defined as a first boundary part, and wherein another part of the boundary opposite the first boundary part is defined as a second boundary part.

5. The connection structure of claim 4, wherein:
   three slots of the first-type structures adjacent to the first boundary part are defined as first slots;
   three slots of the second-type structures adjacent to the first boundary part are defined as second slots; and
   the three-phase (U-, W- and V-phase) withdrawal lines withdrawn from the first slots and the second slots are directly connected to the three-phase withdrawal parts.

6. The connection structure of claim 5, wherein the N-phase withdrawal lines withdrawn from the first slots and the second slots are connected to three-phase (U-, W- and V-phase) serial connection parts.

7. The connection structure of claim 4, wherein:
   three slots of the first-type structures located in a counterclockwise direction based on the first slots are defined as third slots;
   three slots of the second-type structures located in a clockwise direction based on the second slots are defined as fourth slots; and
   the N-phase withdrawal lines withdrawn from the third slots are connected to one another by a first N-phase serial connection part, and the N-phase withdrawal lines withdrawn from the fourth slots are connected to one another by a second N-phase serial connection part.

8. The connection structure of claim 4, wherein:
   three slots of the first-type structures adjacent to the second boundary part are defined as fifth slots;
   three slots of the second-type structures adjacent to the second boundary part are defined as sixth slots; and
   the N-phase withdrawal lines withdrawn from the fifth slots are connected to one another by a first N-phase serial connection part, and the N-phase withdrawal lines withdrawn from the sixth slots are connected to one another by a second N-phase serial connection part.

9. The connection structure of claim 8, wherein the three-phase (U-, W- and V-phase) withdrawal lines withdrawn from the fifth slots and the sixth slots are connected to three-phase (U-, W- and V-phase) serial connection parts.

10. The connection structure of claim 8, wherein:
   three slots of first-type structures adjacent to the fifth slots are defined as seventh slots;
   three slots of the second-type structures adjacent to the sixth slots are defined as eighth slots; and
   the three-phase (U-, W- and V-phase) withdrawal lines withdrawn from the seventh slots and the eighth slots are directly connected to the three-phase withdrawal parts.

11. A connection structure of a stator of a drive motor, the connection structure configured to allow coils to be wound in a plurality of slots provided in a stator core and to expose the coils from an upper end of the stator core, wherein:
   the coils are wound in the slots to form first-type structures and second-type structures configured such that a withdrawal direction of three-phase (U-, W- and V-phase) withdrawal lines withdrawn from the slots of the first-type structures and a withdrawal direction of N-phase withdrawal lines withdrawn from the slots of the first-type structures are opposite to a withdrawal direction of three-phase (U-, W- and V-phase) withdrawal lines withdrawn from the slots of the second-type structures and a withdrawal direction of N-phase withdrawal lines withdrawn from the slots of the second-type structures;

the stator core comprises eight poles and twenty-four slots; and each of the first-type structures and the second-type structures are applied to twelve of the 24 slots continuously arranged.

12. The connection of claim 11, wherein:

the first-type structures are configured such that each of the three-phase (U-, W- and V-phase) withdrawal lines is withdrawn from a first side of a corresponding one of the first-type structures, and each of the N-phase withdrawal lines is withdrawn from a second side of the corresponding one of the first-type structures; and the second-type structures are configured such that each of the N-phase withdrawal lines is withdrawn from a first side of a corresponding one of the second-type structures, and each of the three-phase (U-, W- and V-phase) withdrawal lines is withdrawn from a second side of the corresponding one of the second-type structures.

13. The connection of claim 12, wherein the first side of the corresponding one of the first-type structures and the second side of the corresponding one of the second-type structures mean a side of the corresponding one of the first-type structures and a side of the corresponding one of the second-type structures, configured to face a boundary between the first-type structures and the second-type structures based on a circumferential direction of the stator core.

14. The connection of claim 11, wherein the three-phase (U-, W- and V-phase) withdrawal lines withdrawn from the slots of the first-type structures and the second-type structures, configured to be located at first, second, third, seventh, eighth and ninth positions based on a part of a boundary between the first-type structures and the second-type structure adjacent to three-phase withdrawal parts, configured such that the three-phase (U-, W- and V-phase) withdrawal lines are collected therein, are directly connected to the three-phase withdrawal parts.

15. The connection of claim 14, wherein:

the N-phase withdrawal lines withdrawn from the slots of the first-type structures, configured to be located at tenth, eleventh and twelfth positions based on the boundary, are connected to one another by a first N-phase serial connection part; and the N-phase withdrawal lines withdrawn from the slots of the second-type structures, configured to be located at tenth, eleventh and twelfth positions based on the boundary, are connected to one another by a second N-phase serial connection part.

* * * * *